Figure 1:
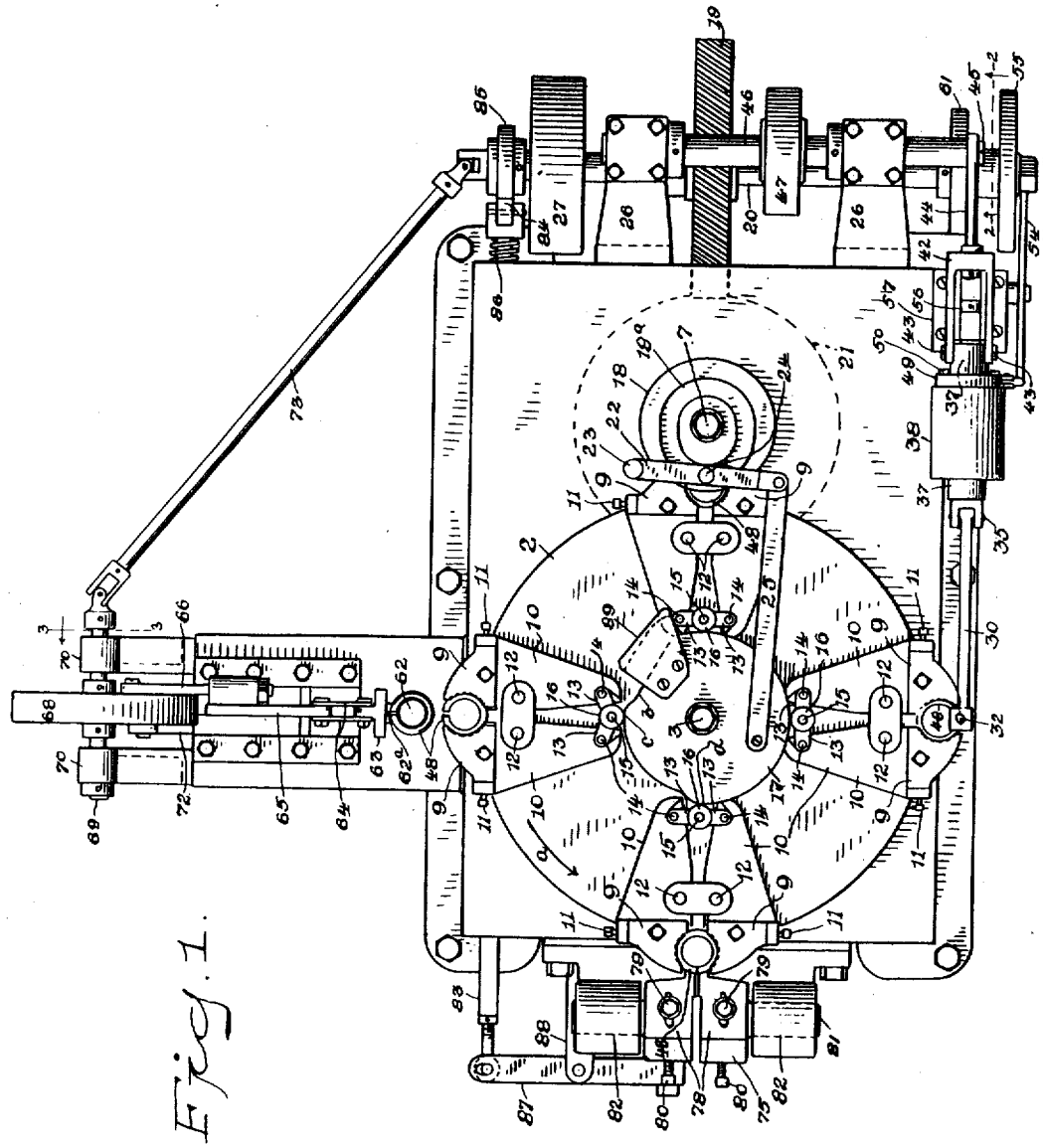

M. B. RYAN.
ELECTRICAL WELDING MACHINE.
APPLICATION FILED SEPT. 9, 1907. RENEWED SEPT. 8, 1911.

1,023,128.

Patented Apr. 16, 1912.

6 SHEETS—SHEET 1.

Witnesses:
H. A. Lamb.
G. W. Finn

Inventor
Michael B. Ryan.
By his Attorney
Geo. O. Phillips

M. B. RYAN.
ELECTRICAL WELDING MACHINE.
APPLICATION FILED SEPT. 9, 1907. RENEWED SEPT. 8, 1911.
1,023,128.
Patented Apr. 16, 1912.
6 SHEETS—SHEET 2.
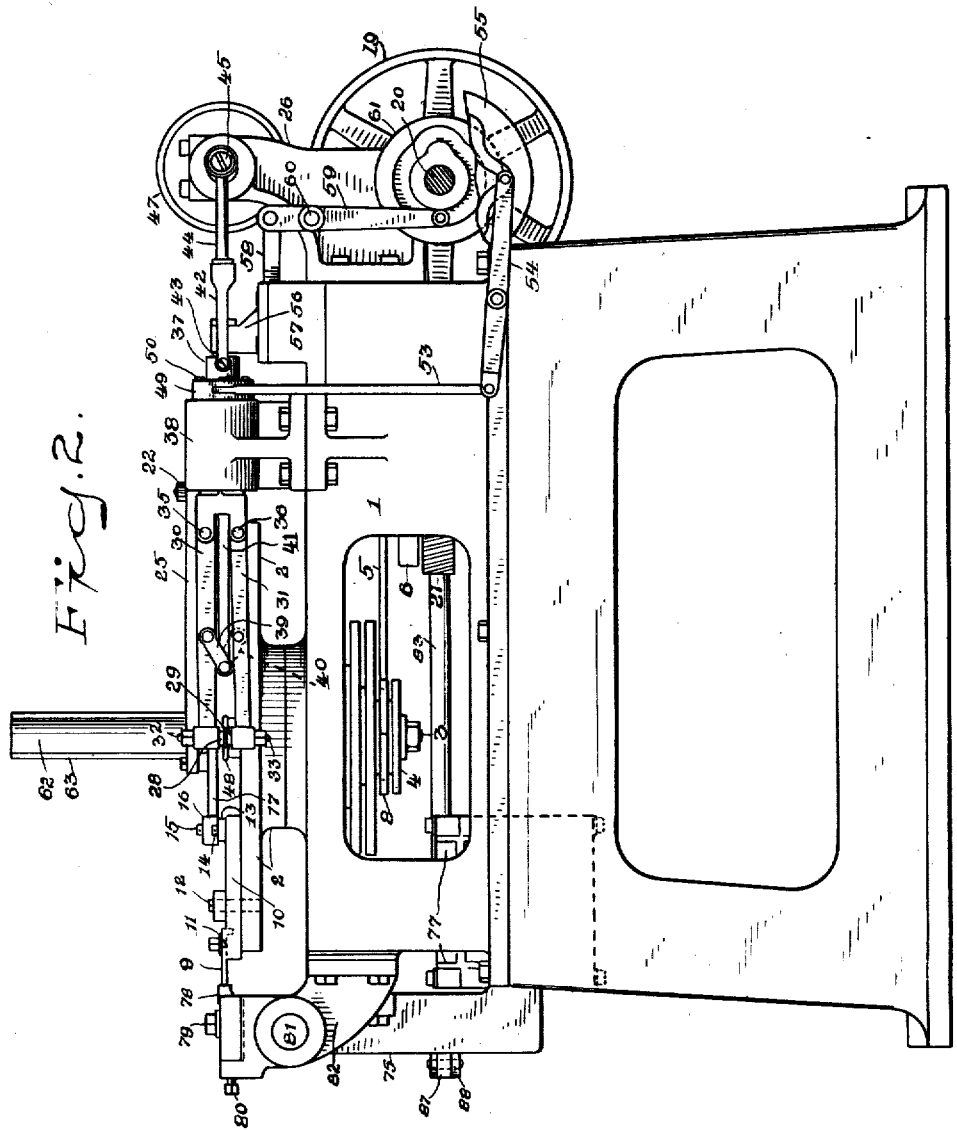
Witnesses:
H. A. Lamb.
G. W. Fiau.
Inventor
Michael B. Ryan.
By his Attorney Geo. O. Phillips.

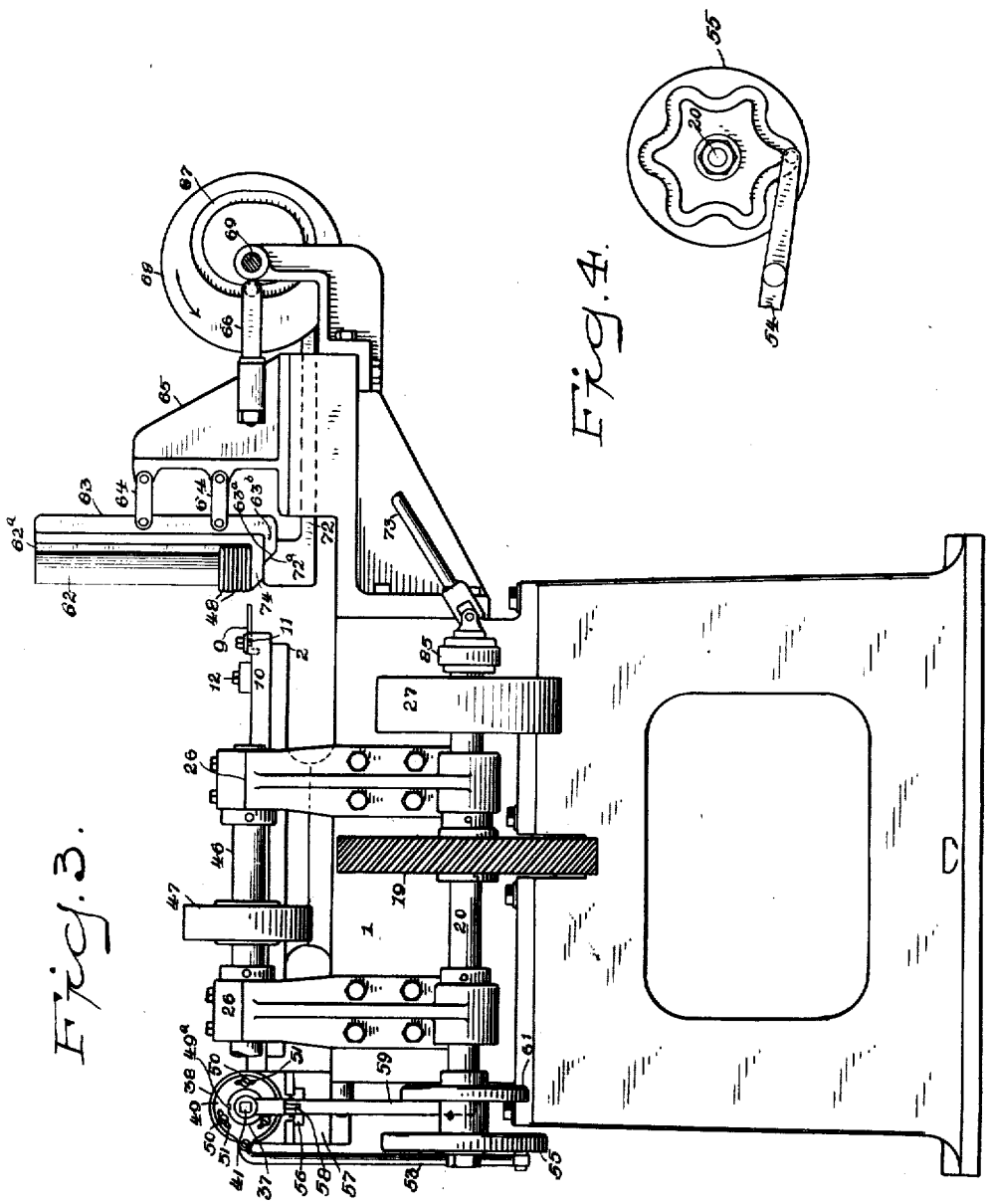

M. B. RYAN.
ELECTRICAL WELDING MACHINE.
APPLICATION FILED SEPT. 9, 1907. RENEWED SEPT. 8, 1911.
1,023,128.
Patented Apr. 16, 1912.
6 SHEETS—SHEET 4.
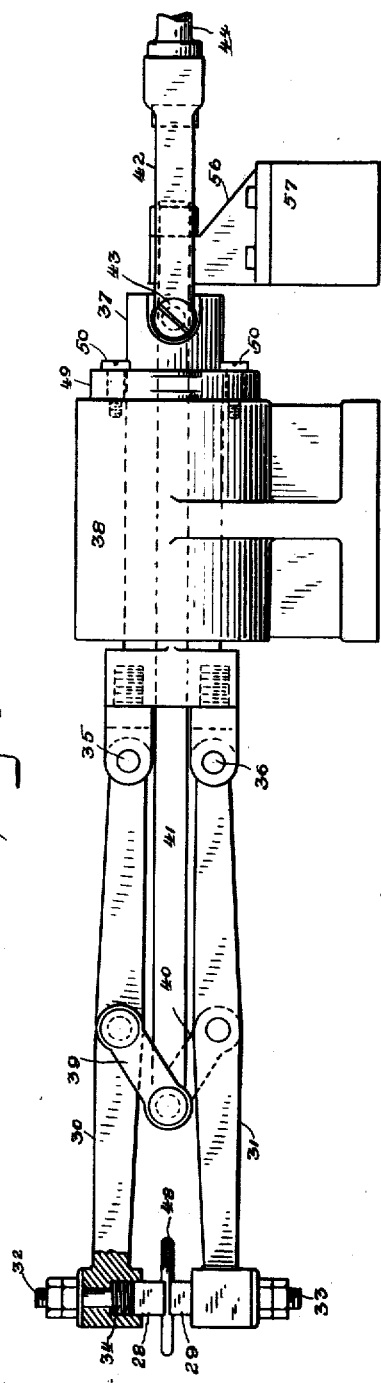
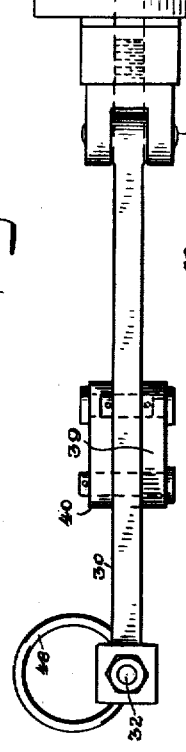
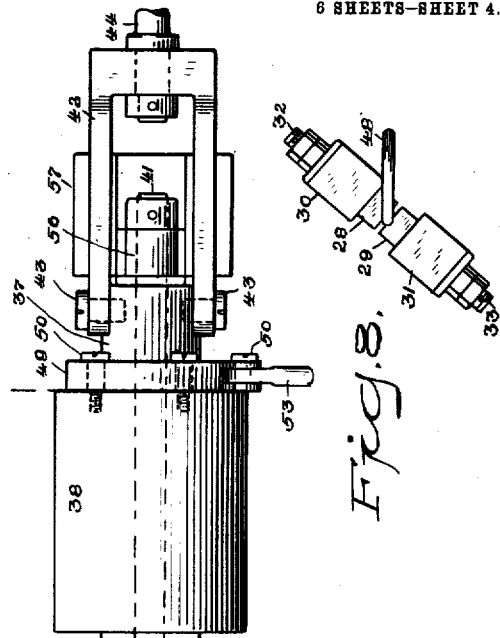
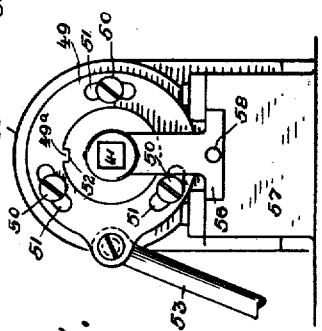
Witnesses:
H. A. Lamb.
G. W. Finn
Inventor
Michael B. Ryan
By his Attorney
Geo. W. Phillips.

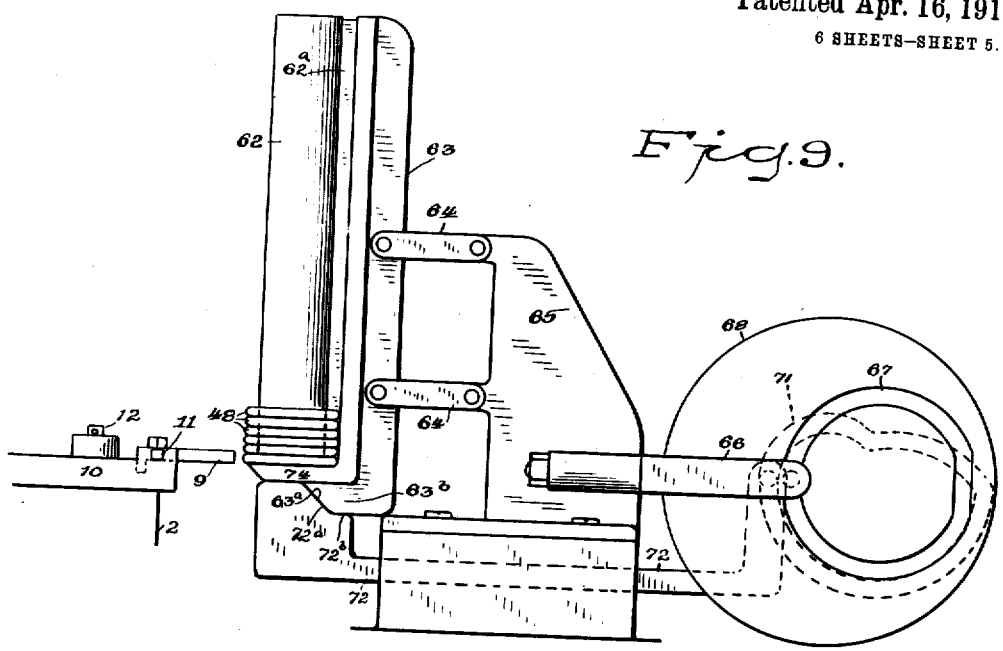

M. B. RYAN.
ELECTRICAL WELDING MACHINE.
APPLICATION FILED SEPT. 9, 1907. RENEWED SEPT. 8, 1911.
1,023,128.
Patented Apr. 16, 1912.
6 SHEETS—SHEET 6.
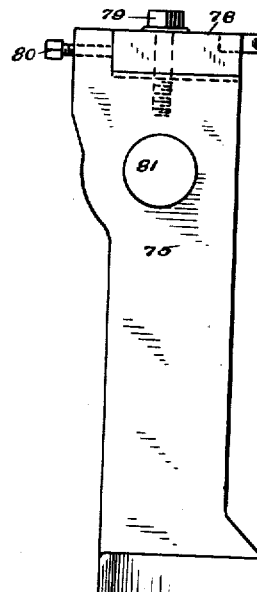
Fig. 11.
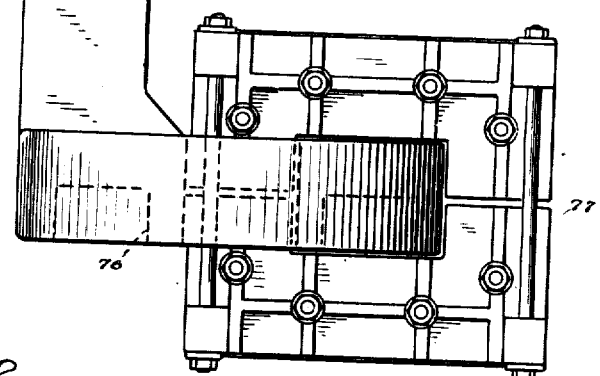
Fig. 12.
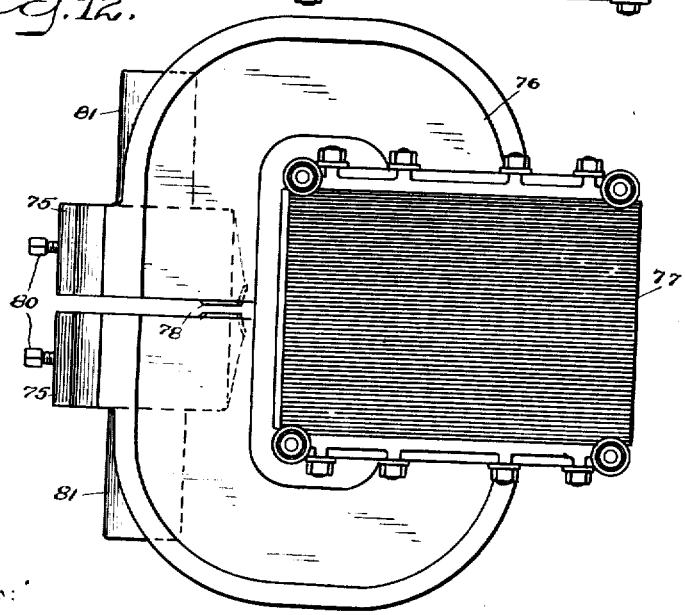
Witnesses:
H. A. Lamb
G. W. Finn
Inventor
Michael B. Ryan
By his Attorney
Geo. D. Phillips

UNITED STATES PATENT OFFICE.

MICHAEL B. RYAN, OF BRIDGEPORT, CONNECTICUT, ASSIGNOR TO McKINNON CHAIN COMPANY, A CORPORATION OF NEW YORK.

ELECTRICAL WELDING-MACHINE.

1,023,128.  Specification of Letters Patent.  Patented Apr. 16, 1912.

Application filed September 9, 1907, Serial No. 391,855. Renewed September 8, 1911. Serial No. 648,396.

*To all whom it may concern:*

Be it known that I, MICHAEL B. RYAN, a citizen of the United States, and a resident of Bridgeport, in the county of Fairfield and State of Connecticut, have invented certain new and useful Improvements in Electrical Welding-Machines, of which the following is a specification.

My invention relates to electrical welding machines, and it consists in certain details of construction to be more fully set forth in the following specification.

To enable others to understand my invention reference is had to the accompanying drawings, in which:

Figure 1 represents an upper plan view of the machine; Fig. 2 is a side elevation of the machine and sectional view of the driving shaft on line 2 of Fig. 1, also broken view of the cam for operating the swaging hammers; Fig. 3 is an end elevation and sectional view of the cam shaft of the ring feeding mechanism on line 3 of Fig. 1, also broken view of the universal joint for driving said shaft and broken view of the crank shaft; Fig. 4 is a detail side elevation of the swaging cam and its lever; Fig. 5 is an enlarged side elevation partly in section of the ring swaging mechanism; Fig. 6 is an enlarged upper plan view of the mechanism shown at Fig. 5; Fig. 7 is an enlarged end elevation of the swaging mechanism and its supporting standard, and broken view of the connecting-rod for oscillating the swaging mechanism; Fig. 8 is an enlarged end elevation of the swaging hammers and their supports, showing a ring being swaged; Fig. 9 in an enlarged side elevation of the ring feeding magazine and its operating mechanism, and broken view of the turret and one of the ring holding grippers, showing the magazine in its retreated position; Fig. 10 is a similar construction, showing the magazine advanced to feed a ring into the gripper with the jaws of the gripper omitted; Fig. 11 is an enlarged detail side elevation of the transformer, and Fig. 12 is an enlarged detail bottom plan view of the same.

1 represents the machine bed, 2 the turret mounted thereon and journaled on the central bolt 3. The turret is adapted to have an intermittent rotary movement in the direction of arrow *a* of Fig. 1. The manner of effecting this movement forms no part of the present invention, and, being old and well known, a detail description of its construction will be unnecessary. It will, therefore, be sufficient to say that 4 (Fig. 2) is a ratchet wheel secured to a lower projection of the turret and is actuated by the lever 5 whose inner end carries a roll (not shown) working in a cam groove (not shown) in the upper face of the cam plate 6, this plate being secured to the short vertical shaft 7 shown at Fig. 1. 8 (Fig. 2) is a detent wheel in which a pawl (not shown) engages with the ratchet wheel to prevent a retrograde movement of the turret.

The turret (Fig. 1) carries four sets of ring holding grippers, which grippers, being constructed alike, will be designated by the same figures of reference. The grippers for holding the article to be welded comprise the jaws 9 adjustably mounted on the levers 10 through the medium of the screws 11.

12 are pins on which the levers 10 are pivoted. 13 are toggle arms for actuating said levers whose outer ends are journaled on the pins 14, and their inner ends on the pin 15. 16 is a roll on this central pin adapted to be actuated by the cam 17 to open and close the grippers. This cam is journaled on the bolt 3 and has an oscillating movement thereon independent of the rotary movement of the turret 2. This oscillating movement is effected through the medium of the cam 18 secured to the shaft 7 whose rotary movement is effected by means of the spiral gear 19 on the driving shaft 20, and the gear 21 on shaft 7.

22 is a lever pivotally supported at one end to the stud 23, and 24 is a pin carried by this lever on whose inner end is mounted a roll (not shown) adapted to travel in the cam groove 18ª. 25 is another lever pivoted by one end to the outer end of the lever 22 and by the other end to the cam 17. The driving shaft 20 is journaled in the brackets 26 and is driven by the pulley 27.

The swaging mechanism for reducing the swell or enlargement on the ring produced by the electrical weld is as follows: 28 and 29 (Fig. 5) are the hammer faces mounted in the heads of the vibrating arms 30 and 31. 32 and 33 are bolts carrying the hammer faces and back of each hammer face is a spring to afford an elastic support or cushion therefor. One of such springs, 34, being shown. The inner ends of the hammer arms are pivotally supported on the pins 35 and 36 carried by the head portion of the oscillating shaft 37, journaled in the standard 38. 39 and 40 are links pivotally connected by one end to the hammer arms 30 and 31, and by the other end to the end of the square rod 41. Said rod 41 is connected with the sliding block 56, which is held against movement while the swaging operation is taking place, and is only moved when the turret is being rotated as hereinafter set forth. 42 is a clip whose arms are secured to the end of the shaft 37 by the screws 43. The head of this clip is journaled on the inner end of the connecting rod 44 so as to permit the shaft 37 to turn for the purpose presently to be described. The other end of this connecting rod is journaled on the body of the screw 45 eccentrically located in the end of the shaft 46 carrying the driving pulley 47 as shown at Figs. 1 and 2. The short throw of the shaft 46 will cause the hammers to give a succession of rapid blows on the ring 48.

The mechanism for oscillating the shaft 37 to bring the hammer faces in contact with the entire circumferential surface of the enlarged welded joint of the ring so as to reduce such joint to the normal size of the ring, is as follows: Referring particularly to Figs. 1, 2, 3 and 7, 49 is a plate lying against the outer face of the standard 38 and is held operatively thereagainst by the screws 50. The slots 51 (Fig. 7) in the plate will permit said plate to oscillate. 49ᵃ is a feather integral with this plate, adapted to enter the groove 52 of the shaft 37 so that said shaft will oscillate with the plate. 53 (Fig. 2) is a rod pivotally supported by one end to the plate 49 and by the other end to the inner end of the lever 54, while the opposite end of said lever carries a roll adapted to travel in the grooved cam 55 (see also Fig. 4) mounted on the end of the driving shaft 20. As the hammers are in continuous vibration, it is necessary to carry them out of action while the turret is rotating. This is done by means of the sliding block 56 operatively mounted in the standard 57. This sliding block is secured to the outer end of the square rod 41, and 58 is a stud projecting from this block, to which stud is pivoted the upper end (Fig. 2) of the vertical lever 59, which lever is pivotally supported on the stud 60 projecting from one of the brackets 26. The lower end of this lever carries a roll adapted to travel in the grooved cam 61 mounted on the driving shaft 20. By this arrangement of the sliding block 56 and its operating cam, the hammers are held in a separated position during the rotation of the turret.

Referring to Figs. 1, 3, 9 and 10, 62 is the ring carrying magazine adapted to deliver the rings to the gripping jaws carried by the rotating turret. As the ring is open before the welding operation, this opening in the ring is made use of to properly locate the rings into the grippers of the turret and with respect to the electrodes, presently to be described. As a matter of convenience in the construction of the magazine, it is made tubular with the rearwardly projecting fin 62ᵃ to serve as a guide for the rings so that, by means of said fin, the openings of all the rings may be kept in vertical alinement with each other. 63 is a frame to which the magazine is attached, and 64 are links pivotally connecting this frame with the movable support 65, which support is actuated through the medium of the roll carrying rod 66 and cam groove 67 in the face of the cam plate 68 mounted on the shaft 69, journaled in the brackets 70. On the opposite face of this cam plate (see also Fig. 9) is the cam groove 71 with which the outer roll carrying end of the lower slide 72 engages to give said slide a reciprocatory movement to and from the turret 2. The inner end or head of said slide (see also Fig. 10) has the inclined face 72ᵃ and the straight portion or seat 72ᵇ. The lower end of the frame 63 has the beveled toe 63ᵃ and a straight portion adapted to normally rest on the seat 72ᵇ of the slide 72. 73 is a universal joint or link rotatively connecting the magazine cam shaft with the main driving shaft 20.

The normal position of the magazine and its operating mechanism is shown at Figs. 1, 3 and 9, and when the turret has rotated to bring a pair of grippers into position to receive a ring, the magazine support 65 will be moved forward so as to place the rings on the magazine in direct vertical alinement with the jaws of the grippers. This forward movement will cause the beveled end 63ᵃ of the foot 63ᵇ of the magazine frame to move up the inclined face 72ᵃ of the slide 72 and thus raise the magazine above the jaws 9 of the turret and seat the frame 63 temporarily on the straight portion 72ᶜ of the slide 72 as shown at Fig. 10. When the magazine is in this forward elevated position, the slide 72 will be moved forward until the normal seat for the magazine carrying frame is in vertical alinement therewith, and when in this position the frame will drop by gravity into said seat, and when thus seated the lowest ring on the magazine will be within the embrace of the open gripper, which will then close about said ring in the manner presently to be described, and exert a pressure sufficient to retain the ring within their embrace while the magazine is being carried back. It will be noted that the lower end of the magazine is located above the foot 71 and at a distance equal to the thickness of a ring so that, when the magazine retreats, this lower ring will easily slip from its seat. The ring supporting foot 74 is a thin angular projection of the magazine carrying frame upon which projection the rings rest and is narrow enough to pass through the open jaws of the gripper when the magazine drops to bring a ring within the embrace of said jaws.

Heretofore, in welding machines of this character, it has been the custom to move one or both of the electrodes of the transformer along the surface of the secondary to and from the article to be welded. This frictional contact caused sparking, which resulted in the formation of scale on the meeting faces of the electrodes and secondary part of the transformer and thus greatly minimized the current available for welding due to the low voltage. This result will always take place when there is a movable joint in the secondary, or with a secondary in two parts with one part movable on the other. This objectionable feature in electrical welding I have fully overcome by maintaining an immovable contact between the electrodes and the secondary part of the transformer, by bodily moving the latter on a pivotal support, and do this by gravity, thus avoiding the use of any mechanical device, such as cams, springs or levers to maintain the firm contact between the electrodes and the article so necessary for a perfect weld.

The transformer shown at Figs. 11 and 12 is composed of the usual elements, viz: the secondary 75, the base having the recess 76 for the primary coil (not shown); the laminated core plates 77 and the electrodes 78, which electrodes, strictly speaking, are part of the secondary but made separate for adjustment. These latter are held by the screws 79 in firm and immovable contact with the secondary when welding, and are only shifted when the current is off by means of the screws 80 to compensate for wear taking place at the point of electrical contact with the ring. 81 are journals or trunnions projecting from the secondary part of the transformer and are located close to the upper end so as to give an increased leverage and a corresponding increase of pressure at the contact point of the electrodes. This increased pressure is automatically obtained by throwing the greater bulk or weight of the transformer out of the center of gravity of its pivotal support. 82 (Figs. 1 and 2) are brackets for supporting the transformer by its journals or trunnions. The transformer is tilted to carry the electrodes away from the welding field when the turret is rotating, as follows: 83 (Fig. 1) is a rod extending through the machine-bed carrying at one end the roll 84 to engage the cam 85 on the driving shaft 20, and 86 is a spring to insure such engagement. 87 is a lever pivotally supported in the standard 88 whose free end is adapted to engage the transformer near its lower end (Fig. 2) so as to move easily this great weight of metal. The opposite end of the lever 87 is pivotally connected with the rod 83.

When the magazine is over a pair of the grippers, the roll 16 (Fig. 1) carried by the grippers will be at the point $b$ of the oscillating cam 17, which position will indicate that the jaws 9 are open to receive. Just before the magazine is retreated, the cam 17 will rotate so as to bring the roll 16 on to the rise $c$ as shown. This movement will partially close the jaws about the ring sufficient to retain it therein when the magazine is being carried back, and also during the rotation of the turret to bring the ring into the welding field. When this position is reached, the rise $d$ of the cam 17 will give the final squeeze so as to close up the open joint and bring the abutting ends firmly together, and this pressure is continued while the heat is being applied so as to insure a perfect union. This pressure and fusion will naturally cause an overflow or enlargement of the joint to be removed by the next operation. When the pair of jaws are brought into the position just described, the retaining pressure or restraint on the transformer will be released to allow the electrodes to be brought by gravity against the ring, and the excessive weight, as before mentioned, of the transformer will insure a firm and immovable contact during the welding operation. When the welding is done, the turret will be rotated to bring the now heated joint of the ring under the hammers where the operation of the hammers will reduce the swell or bur caused by welding. Said hammers rotating, as before mentioned, through an arc of a circle (Fig. 8) will contact with all parts of the welded joint and reduce the same. After the hammers have performed their operation, the rotating turret will carry the completed ring to the point of discharge which will be situated at a distance from the last operation to afford sufficient time for the temperature of the ring to fall to a point where it may safely be discharged and thus give the weld an opportunity to set and prevent the outward spring of the ring when released opening the joint. To effect this discharge, the cam plate 89 (Fig. 1) engages the roll 16 and brings said roll on to the lowest part $b$ of the cam 17. This operation will open the grippers and allow the ring to drop therefrom and just before the position is reached for another ring to be received from the magazine. It will be understood that the several operations, viz: receiving, welding and hammering, are all being performed at one and the same time. In other words, when a ring is being deposited in one pair of grippers, a ring is being welded in another pair, and the hammering process is being performed in still another pair of grippers, and, of course, when the turret is stationary, while the discharge is effected when the turret is rotating.

While I show means specially adapted for holding rings to be welded, it will be understood that the machine is adapted to handle any separate article by simply changing the jaws and magazines to conform thereto.

So far as I am aware I am the first person to make use of a turret bearing thereon tongs, which are moved with the same, and are capable of being opened and closed. The difficulty of operating the holding tongs upon a revolving plate is apparent, and the operation of the cam used by me for this purpose is entirely new and of great utility. The use of a turret for welding purposes is of considerable advantage, for while one of the articles is being welded on one portion of the same, the bur is being removed from another of said articles which has just been welded, thus insuring great economy of time, space and power. While I have described but a single set of electrodes and a single set of the swaging apparatus, I by no means desire so to limit my invention. The movable magazine I also believe to be new, and as used in connection with the gripping tongs mounted on the turret, is essential to the successful operation of the machine. Since the turret revolves, it is necessary to move the magazine to each pair of tongs when opposite the same, and then immediately to retract the same out of the way of said tongs. For the same reason, it is necessary to have the secondary carrying the electrodes yieldingly mounted, in order that proper engagement may be effected between the electrodes and the article to be welded.

Having thus described my invention, what I claim as new and desire to secure by Letters Patent is:—

1. In an electrical welding machine, an automatically and intermittently rotatable turret, grippers mounted thereon, means for opening and closing the grippers, a magazine for discharging an article to be welded into the grippers, a movable transformer carrying electrodes secured thereto, rotatable swaging hammers and suitable means for operating the same, said hammers being adapted to reduce the swell caused by welding, for the purpose set forth.

2. In an electrical welding machine, an automatically and intermittently rotatable turret, grippers automatically operated to open and close mounted thereon, a magazine for discharging the article to be welded into the grippers, electrodes for welding, swaging hammers for reducing the swell or bur caused by welding, and suitable means for operating said hammers all arranged and combined to operate, for the purpose set forth.

3. In an electrical welding machine, an automatically and intermittently rotatable turret, grippers automatically operated to open and close mounted thereon, means for automatically delivering an article to be welded into the grippers, a movable transformer carrying electrodes secured thereto, and means for actuating the transformer to carry the electrodes temporarily out of contact with the article to be welded, said transformer actuated by gravity when released to bring the electrodes forcibly against the article to be welded, for the purpose set forth.

4. In an electrical welding machine of the character described, a gravity actuated transformer carrying electrodes, an automatically rotatable turret, and grippers for temporarily holding an article to be welded mounted thereon, for the purpose set forth.

5. In an electrical welding machine of the character described, a gravity actuated transformer, electrodes secured thereto, an automatically rotatable turret, and grippers for temporarily holding an article to be welded carried by the turret, for the purpose set forth.

6. In an electrical welding machine of the character described, a rotatable turret, grippers for temporarily holding an article to be welded and carried by the turret, and a gravity actuated transformer carrying electrodes adapted to bring its electrodes into forcible engagement with the article to be welded, for the purpose set forth.

7. In an electrical welding machine of the character described, a rotatable turret, grippers thereon for temporarily holding an article to be welded, a movable transformer carrying electrodes, rotatable opposed swaging hammers and suitable means for operating the same, said hammers being adapted to reduce the bur caused by welding, for the purpose set forth.

8. In an electrical welding machine of the character described, an intermittently rotatable turret, grippers thereon adapted to hold an article to be welded, a movable transformer carrying electrodes, and means for actuating said grippers to forcibly grip the article during the welding operation and retain said article until sufficiently cooled to avoid breaking the joint when said article is released, for the purpose set forth.

9. In an electrical welding machine, an intermittently rotatable turret, grippers thereon and rotating with the turret, a feeding magazine, a movable transformer, rotatable opposed swaging hammers, means for actuating the grippers to retain an article and carry it from the magazine to the transformer to be welded, and from the transformer to the hammers for the reduction of the bur caused by welding, and means for actuating the grippers to release the article after it has sufficiently cooled, for the purpose set forth.

10. In an electrical welding machine, an intermittently rotatable turret, grippers thereon and rotating with the turret, a feeding magazine, a movable transformer, rotatable opposed swaging hammers, means for actuating the grippers to receive an article from the magazine and present it to the transformer and increase the pressure of the grippers during the operation of welding and retain such pressure during the operation of the hammers, and means for actuating the grippers to release the article when sufficiently cooled, for the purpose set forth.

11. In an electrical welding machine, an intermittently rotatable turret, a plurality of pairs of grippers thereon and rotating with the turret, a feeding magazine for holding articles to be welded, a transformer for welding, automatically operating swaging hammers for reducing the bur caused by welding, said magazine, transformer and hammers located about the circumferential path of the turret, means for automatically actuating the grippers under the magazine to close upon an article fed therefrom, means, when an article is in the welding field, to actuate said grippers to give an increased pressure on the article, to be welded, said grippers adapted to retain their hold and pressure on the article until sufficiently cooled, and means for opening the grippers to discharge a finished article therefrom, for the purpose set forth.

12. In an electrical welding machine, an intermittently rotatable turret, a feeding magazine, a movable transformer, a pair of opposed swaging hammers, said magazine, transformer and hammers located about the circumferential path of the turret and in the order named, grippers mounted on the turret, means for actuating the grippers to receive an article at the magazine, and, through the medium of the rotating turret, presenting said article first to the transformer to be welded, then to the hammers for the reduction of the bur caused by welding and for retaining possession of the article until sufficiently cooled, for the purpose set forth.

13. In an electrical welding machine, a frame, a transformer pivotally supported on said frame, said transformer carrying electrodes and being automatically actuated by gravity into the welding field, for the purpose set forth.

14. In an electrical welding machine, the combination with a transformer carrying electrodes and means for holding an article to be welded, of swaging hammers adapted to reduce the overflow of a welded joint, means for rotating the hammers about said joint while swaging, and means for temporarily suspending said hammers out of action, for the purpose set forth.

15. In an electrical welding machine, an intermittently rotatable turret, grippers, a movable transformer carrying electrodes, rotatable swaging hammers, said grippers adapted to grasp an article to be welded, and, through the medium of the turret, advance it to the electrodes, means for actuating the grippers to give the necessary end squeeze to the article to upset the heated metal at the weld, and maintain such pressure while under the swaging hammers and until the joint has cooled sufficiently to set, and means for opening the grippers to discharge the article for the purpose set forth.

16. In an electrical welding machine, an intermittently rotatable turret, grippers mounted thereon, a movable transformer, rotatable swaging hammers, and suitable means for operating said hammers, an article feeding magazine, means for advancing the magazine to the turret carrying grippers, means on said magazine for guiding the article into said grippers, and means for retreating the magazine to permit the turret to rotate, for the purpose set forth.

17. In an electrical welding machine, a rotatable turret, grippers mounted thereon, a transformer carrying electrodes and arranged to move toward and from said grippers, an article feeding magazine, means for advancing the magazine to the turret carrying grippers, means on said magazine for guiding the article to be welded into said grippers, and means for retreating said magazine, for the purpose set forth.

18. In an electrical welding machine, a transformer carrying electrodes, a rotatable turret, grippers mounted thereon, and holding metallic articles having an open joint therein, an article feeding magazine, means on said magazine for guiding the article to be fed into the grippers through the medium of the open joint of said article, for the purpose set forth.

19. In an electrical welding machine, a main frame, a pair of electrodes yieldingly supported upon said main frame, a magazine for the work, and means for moving said work in a circular path from said magazine to said electrodes.

20. In an electrical welding machine, a stationary support, a transformer carrying electrodes pivotally mounted on said stationary support, a magazine for the work, and means for moving said work in a circular path from said magazine to said transformer.

21. In an electrical welding machine, a rotatable turret, gripping tongs secured thereon and adapted to hold the article to be welded, a main frame, combined with electrodes yieldingly supported on said main frame and arranged to engage with said article when said turret is rotated.

22. In an electrical welding machine, a rotatable turret, a plurality of pairs of gripping tongs secured thereon each pair being adapted to hold one of the articles to be welded, a main frame, combined with electrodes yieldingly supported on said main frame and arranged to engage with each of said articles when said turret is rotated.

23. In an electrical welding machine, an automatically rotatable turret, gripping tongs secured to said turret and adapted to hold the article to be welded, a main frame, combined with a pivotally supported transformer mounted on said main frame and carrying electrodes relatively stationary thereto and to each other, the electrodes of said transformer being arranged to engage with said article to be welded when said turret is rotated.

24. In an electrical welding machine, a rotatable turret, gripping tongs secured thereon and adapted to hold the article to be welded, combined with independent means mounted axially of said turret for opening and closing said tongs.

25. In an electrical welding machine, a rotatable turret, gripping tongs secured thereon and adapted to hold the article to be welded, means independent of the turret and disposed at one face thereof for opening and closing said gripping tongs, combined with electrodes mounted independently of said turret and arranged to engage with said article when said turret is rotated.

26. In an electrical welding machine, a rotatable turret, a plurality of pairs of gripping tongs secured thereon each pair being adapted to hold one of the articles to be welded, means independent of the turret and disposed axially thereof for opening and closing said gripping tongs, combined with electrodes arranged to engage with each of said articles when said turret is rotated.

27. In an electrical welding machine, means for holding the article to be welded, an article feeding magazine, and mechanism for automatically moving said magazine to and from said means.

28. In an electrical welding machine, a rotatable turret, gripping tongs secured thereon and adapted to hold the article to be welded, combined with an article feeding magazine, and means for moving said magazine toward and away from said tongs.

29. In an electrical welding machine, a rotatable turret, gripping tongs secured thereon and adapted to hold the article to be welded, combined with an article feeding magazine, and means for automatically moving said magazine toward and away from said tongs.

30. In an electrical welding machine, a rotatable turret, grippers secured thereto at points outside of the axis of rotation of said turret, said grippers being adapted to hold the article to be welded, an article feeding magazine, means for advancing the magazine to said grippers, combined with electrodes mounted independently of said turret and arranged to engage with said article when said turret is rotated.

31. In an electrical welding machine, an automatically rotatable turret, gripping tongs secured to said turret and adapted to hold the article to be welded, an article feeding magazine, means for advancing the magazine to said grippers, combined with a pivotally supported transformer carrying electrodes relatively stationary thereto and to each other, the electrodes of said transformer being arranged to engage with said article to be welded when said turret is rotated.

Signed at Bridgeport in the county of Fairfield and State of Connecticut this 6th day of Sept. A. D. 1907.

MICHAEL B. RYAN.

Witnesses:
  AUG. W. GEDDA,
  JOHN B. CLAPP.